United States Patent
Porter et al.

(10) Patent No.: US 11,907,085 B2
(45) Date of Patent: Feb. 20, 2024

(54) SYSTEM AND METHOD FOR IMPLEMENTING A SMART FAILOVER MODULE

(71) Applicant: JPMorgan Chase Bank, N.A., New York, NY (US)

(72) Inventors: Matthew J Porter, Mechanicsburg, OH (US); Kumar Rao Krishnagi, Powell, OH (US); Vijay Kumar Perla, Westerville, OH (US); Nalini S Boda, Lewis Center, OH (US); Laxman Dongisharapu, Hyderabad (IN); Mark Alan Wells, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 76 days.

(21) Appl. No.: 17/653,177

(22) Filed: Mar. 2, 2022

(65) Prior Publication Data

US 2022/0286430 A1 Sep. 8, 2022

Related U.S. Application Data

(60) Provisional application No. 63/175,232, filed on Apr. 15, 2021.

(30) Foreign Application Priority Data

Mar. 3, 2021 (IN) .............................. 202111008977

(51) Int. Cl.
*G06F 11/20* (2006.01)

(52) U.S. Cl.
CPC ................................ *G06F 11/2028* (2013.01)

(58) Field of Classification Search
CPC ............. G06F 11/2028; G06F 11/2023; G06F 11/2025; G06F 11/203; H04L 41/659;
(Continued)

(56) References Cited

U.S. PATENT DOCUMENTS 7,444,335 B1 * 10/2008 Colrain ................. G06F 11/203
714/4.11
9,575,738 B1 * 2/2017 Chopra .................... G06F 8/60
(Continued)

*Primary Examiner* — Gabriel Chu
(74) *Attorney, Agent, or Firm* — GREENBLUM & BERNSTEIN, P.L.C.

(57) ABSTRACT

Various methods, apparatuses/systems, and media for implementing a smart failover module is disclosed. A processor detects an application specific system fault or degradation event in a first availability zone (AZ) on which an application is running during normal runtime of the application; determines, in response to detecting the application specific system fault or degradation event, whether the application includes an active-passive application infrastructure in which the first AZ is paired with a passive AZ; enables traffic, in connection with running or deployment of the application, on the passive availability zone in response to determining that the application includes an active-passive application infrastructure; and disables traffic from the first AZ on which the application specific system fault or degradation has been detected in response to determining that the application does not include an active-passive application infrastructure and/or in response to enabling traffic on the passive AZ.

20 Claims, 6 Drawing Sheets

(58) Field of Classification Search
CPC ............. H04L 41/0661; H04L 41/0663; H04L 41/0668; H04L 69/40; H04L 67/1034
See application file for complete search history.

(56) References Cited

U.S. PATENT DOCUMENTS

| | | | |
|---|---|---|---|
| 2009/0006888 A1* | 1/2009 | Bernhard | G06F 11/08 714/6.12 |
| 2010/0325473 A1* | 12/2010 | Agneeswaran | G06F 11/2041 714/E11.078 |
| 2011/0022882 A1* | 1/2011 | Jaehde | G06F 11/2035 714/E11.073 |
| 2013/0212205 A1* | 8/2013 | Flockhart | G06F 11/2097 709/248 |
| 2014/0258771 A1* | 9/2014 | Xie | G06F 11/2005 714/4.11 |
| 2017/0206148 A1* | 7/2017 | Mehta | G06F 11/2094 |
| 2018/0165166 A1* | 6/2018 | Wang | G06F 11/2033 |
| 2021/0303423 A1* | 9/2021 | MacCarthaigh | G06F 11/2025 |

* cited by examiner

SYSTEM AND METHOD FOR IMPLEMENTING A SMART FAILOVER MODULE

CROSS-REFERENCE TO RELATED APPLICATIONS

This application claims the benefit of priority from U.S. Provisional Patent Application No. 63/175,232, filed Apr. 15, 2021, which is herein incorporated by reference in its entirety. This application also claims the benefit of priority from Indian Provisional Patent Application No. 202111008977, filed Mar. 3, 2021, which is herein incorporated by reference in its entirety.

TECHNICAL FIELD

This disclosure generally relates to application development, and, more particularly, to methods and apparatuses for implementing a smart failover module that automatically fails over applications to another availability zone (AZ) when a system fault or degradation is detected.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, across the multiple lines of businesses (LOB) at an organization, application developers are constantly faced with a daunting task of developing, testing, and deploying new applications for improving customer experience as well as productivity. As software applications become increasingly more complex, checking out the code, building, testing, and deploying such software applications also become more complex as a large number of unique combinations of paths and modules may be tested for each program. While conventional deployment and operational engines may help address some of the problem, one may still find that the deployment and operational focus required may be challenged at times based on other functional delivery priorities and operations experiences. For example, when running an application on a clustered environment, there may be situations where an application specific service interruption may occur on an AZ that may not be recoverable by the application. However, conventional tools lack the capability of automatically migrating the application to a healthier AZ, thereby resulting in service interruption where otherwise would not have occurred if migrated to another healthier AZ.

SUMMARY

The present disclosure, through one or more of its various aspects, embodiments, and/or specific features or sub-components, provides, among other features, various systems, servers, devices, methods, media, programs, and platforms for implementing a smart failover module that automatically fails over applications to a healthier AZ when a system fault or degradation is detected, but the disclosure is not limited thereto. For example, the present disclosure, through one or more of its various aspects, embodiments, and/or specific features or sub-components, also provides, among other features, various systems, servers, devices, methods, media, programs, and platforms for implementing a smart failover module that implements a self-healing process on the unhealthy AZ, but the disclosure is not limited thereto. In addition, the present disclosure, through one or more of its various aspects, embodiments, and/or specific features or sub-components, also provides, among other features, various systems, servers, devices, methods, media, programs, and platforms for implementing a smart failover module that builds an AZ agnostic application that automatically determines the health of an AZ and automatically migrates applications to a new healthy AZ if the current AZ is determined to be not healthy, but the disclosure is not limited thereto.

According to an aspect of the present disclosure, a method for implementing a smart failover module is disclosed. The method may include: detecting an application specific system fault or degradation event in a first availability zone, among a plurality of availability zones within a datacenter, on which an application is running during normal runtime of the application; determining, in response to detecting the application specific system fault or degradation event, whether the application includes an active-passive application infrastructure in which the first availability zone is paired with a passive availability zone; enabling traffic, in connection with running or deployment of the application, on the passive availability zone in response to determining that the application includes an active-passive application infrastructure; and disabling traffic from the first availability zone on which the application specific system fault or degradation has been detected in response to determining that the application does not include an active-passive application infrastructure and/or in response to enabling traffic on the passive availability zone.

According to another aspect of the present disclosure, the method may further include: implementing a self-healing process on the first availability zone on which the application specific system fault or degradation has been detected.

According to yet another aspect of the present disclosure, the method may further include: determining that the self-healing process is successful; and enabling traffic back onto the first availability zone in response to determining that the self-healing process is successful.

According to a further aspect of the present disclosure, the method may further include: determining whether the application includes an active-active application infrastructure in which the first availability zone is paired with an active availability zone.

According to an additional aspect of the present disclosure, the method may further include: enabling traffic, in connection with running or deployment of the application, on the active availability zone in response to determining that the application includes an active-active application infrastructure.

According to yet another aspect of the present disclosure, the method may further include: enabling traffic, in connection with running or deployment of the application, back onto the first availability zone after successfully performing the self-healing process and in response to determining that the application does not include an active-active application infrastructure.

According to an additional aspect of the present disclosure, the method may further include: determining that the self-healing process is not successful; calling an availability zone API to retrieve information data corresponding to the plurality of zones from the datacenter; dynamically identifying, in response to calling the availability zone API, a second availability zone that has a required capacity for running or deployment of the application among the plurality of availability zones within the same datacenter; automatically replacing, in response to a positive identification, the first availability zone with the second availability zone; and running or deploying the application with the second availability zone.

According to a further aspect of the present disclosure, the method may further include: calling a load balancer API to update new internet protocol (IP) address for a load balancer associated with the running or deployment of the application in response to replacing the first availability zone with the second availability zone.

According to another aspect of the present disclosure, the method may further include: calling a firewall API to update firewall rules associated with the running or deployment of the application in response to replacing the first availability zone with the second availability zone.

According to yet another aspect of the present disclosure, wherein when it is determined that none of the availability zones among the plurality of availability zones within the same datacenter has the required capacity for running or deployment of the application, the method may further include: dynamically identifying, in response to calling the availability zone API, a third availability zone that has a required capacity for running or deployment of the application from the same region, but different datacenter; automatically replacing the first availability zone with the third availability zone; and running or deploying the application with the third availability zone.

According to another aspect of the present disclosure, the method may further include: calling a load balancer API to update new IP address for a load balancer associated with the running or deployment of the application in response to replacing the first availability zone with the third availability zone.

According to another aspect of the present disclosure, the method may further include: calling a firewall API to update firewall rules associated with the running or deployment of the application in response to replacing the first availability zone with the third availability zone.

According to yet another aspect of the present disclosure, the information data may include the following data: platform version that is being run, health information of all availability zones, and capacity details of all availability zones, etc., but the disclosure is not limited thereto.

According to an aspect of the present disclosure, a system for implementing a smart failover module is disclosed. The system may include a datacenter having memories to store information data of all AZs associated with running or deployment of an application; and a processor operatively connected to the datacenter via a communication network. The processor may be configured to: detect an application specific system fault or degradation event in a first AZ, among a plurality of AZs within a datacenter, on which an application is running during normal runtime of the application; determine, in response to detecting the application specific system fault or degradation event, whether the application includes an active-passive application infrastructure in which the first AZ is paired with a passive AZ; enable traffic, in connection with running or deployment of the application, on the passive AZ in response to determining that the application includes an active-passive application infrastructure; and disable traffic from the first AZ on which the application specific system fault or degradation has been detected in response to determining that the application does not include an active-passive application infrastructure and/or in response to enabling traffic on the passive AZ.

According to another aspect of the present disclosure, the processor may be further configured to: implement a self-healing process on the first AZ on which the application specific system fault or degradation has been detected.

According to yet another aspect of the present disclosure, the processor may be further configured to: determine that the self-healing process is successful; and enable traffic back onto the first AZ in response to determining that the self-healing process is successful.

According to a further aspect of the present disclosure, the processor may be further configured to: determine whether the application includes an active-active application infrastructure in which the first AZ is paired with an active AZ.

According to an additional aspect of the present disclosure, the processor may be further configured to: enable traffic, in connection with running or deployment of the application, on the active AZ in response to determining that the application includes an active-active application infrastructure.

According to yet another aspect of the present disclosure, the processor may be further configured to: enable traffic, in connection with running or deployment of the application, back onto the first AZ after successfully performing the self-healing process and in response to determining that the application does not include an active-active application infrastructure.

According to an additional aspect of the present disclosure, the processor may be further configured to: determine that the self-healing process is not successful; call an AZ API to retrieve information data corresponding to the plurality of zones from the datacenter; dynamically identify, in response to calling the AZ API, a second AZ that has a required capacity for running or deployment of the application among the plurality of AZs within the same datacenter; automatically replace, in response to a positive identification, the first AZ with the second AZ; and run or deploy the application with the second AZ.

According to a further aspect of the present disclosure, the processor may be further configured to: call a load balancer API to update new IP address for a load balancer associated with the running or deployment of the application in response to replacing the first AZ with the second AZ.

According to another aspect of the present disclosure, the processor may be further configured to: call a firewall API to update firewall rules associated with the running or deployment of the application in response to replace the first AZ with the second AZ.

According to yet another aspect of the present disclosure, wherein when it is determined that none of the AZs among the plurality of AZs within the same datacenter has the required capacity for running or deployment of the application, the processor may be further configured to: dynamically identify, in response to calling the AZ API, a third AZ that has a required capacity for running or deployment of the application from the same region, but different datacenter; automatically replace the first AZ with the third AZ; and run or deploy the application with the third AZ.

According to another aspect of the present disclosure, the processor may be further configured to: call a load balancer API to update new IP address for a load balancer associated with the running or deployment of the application in response to replacing the first AZ with the third AZ.

According to another aspect of the present disclosure, the processor may be further configured to: call a firewall API to update firewall rules associated with the running or deployment of the application in response to replacing the first AZ with the third AZ.

According to an aspect of the present disclosure, a non-transitory computer readable medium configured to store instructions for implementing a smart failover module is disclosed. The instructions, when executed, may cause a processor to perform the following: detecting an application specific system fault or degradation event in a first AZ, among a plurality of AZs within a datacenter, on which an application is running during normal runtime of the application; determining, in response to detecting the application specific system fault or degradation event, whether the application includes an active-passive application infrastructure in which the first AZ is paired with a passive AZ; enabling traffic, in connection with running or deployment of the application, on the passive AZ in response to determining that the application includes an active-passive application infrastructure; and disabling traffic from the first AZ on which the application specific system fault or degradation has been detected in response to determining that the application does not include an active-passive application infrastructure and/or in response to enabling traffic on the passive AZ.

According to another aspect of the present disclosure, wherein the instructions, when executed, may further cause the processor to perform the following: implementing a self-healing process on the first AZ on which the application specific system fault or degradation has been detected.

According to yet another aspect of the present disclosure, wherein the instructions, when executed, may further cause the processor to perform the following: determining that the self-healing process is successful; and enabling traffic back onto the first AZ in response to determining that the self-healing process is successful.

According to a further aspect of the present disclosure, wherein the instructions, when executed, may further cause the processor to perform the following: determining whether the application includes an active-active application infrastructure in which the first AZ is paired with an active AZ.

According to an additional aspect of the present disclosure, wherein the instructions, when executed, may further cause the processor to perform the following: enabling traffic, in connection with running or deployment of the application, on the active AZ in response to determining that the application includes an active-active application infrastructure.

According to yet another aspect of the present disclosure, wherein the instructions, when executed, may further cause the processor to perform the following: enabling traffic, in connection with running or deployment of the application, back onto the first AZ after successfully performing the self-healing process and in response to determining that the application does not include an active-active application infrastructure.

According to an additional aspect of the present disclosure, wherein the instructions, when executed, may further cause the processor to perform the following: determining that the self-healing process is not successful; calling an AZ API to retrieve information data corresponding to the plurality of zones from the datacenter; dynamically identifying, in response to calling the AZ API, a second AZ that has a required capacity for running or deployment of the application among the plurality of AZs within the same datacenter; automatically replacing, in response to a positive identification, the first AZ with the second AZ; and running or deploying the application with the second AZ.

According to a further aspect of the present disclosure, wherein the instructions, when executed, may further cause the processor to perform the following: calling a load balancer API to update new IP address for a load balancer associated with the running or deployment of the application in response to replacing the first AZ with the second AZ.

According to another aspect of the present disclosure, wherein the instructions, when executed, may further cause the processor to perform the following: calling a firewall API to update firewall rules associated with the running or deployment of the application in response to replacing the first AZ with the second AZ.

According to yet another aspect of the present disclosure, wherein when it is determined that none of the AZs among the plurality of AZs within the same datacenter has the required capacity for running or deployment of the application, and wherein the instructions, when executed, may further cause the processor to perform the following: dynamically identifying, in response to calling the AZ API, a third AZ that has a required capacity for running or deployment of the application from the same region, but different datacenter; automatically replacing the first AZ with the third AZ; and running or deploying the application with the third AZ.

According to another aspect of the present disclosure, wherein the instructions, when executed, may further cause the processor to perform the following: calling a load balancer API to update new IP address for a load balancer associated with the running or deployment of the application in response to replacing the first AZ with the third AZ.

According to another aspect of the present disclosure, wherein the instructions, when executed, may further cause the processor to perform the following: calling a firewall API to update firewall rules associated with the running or deployment of the application in response to replacing the first AZ with the third AZ.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
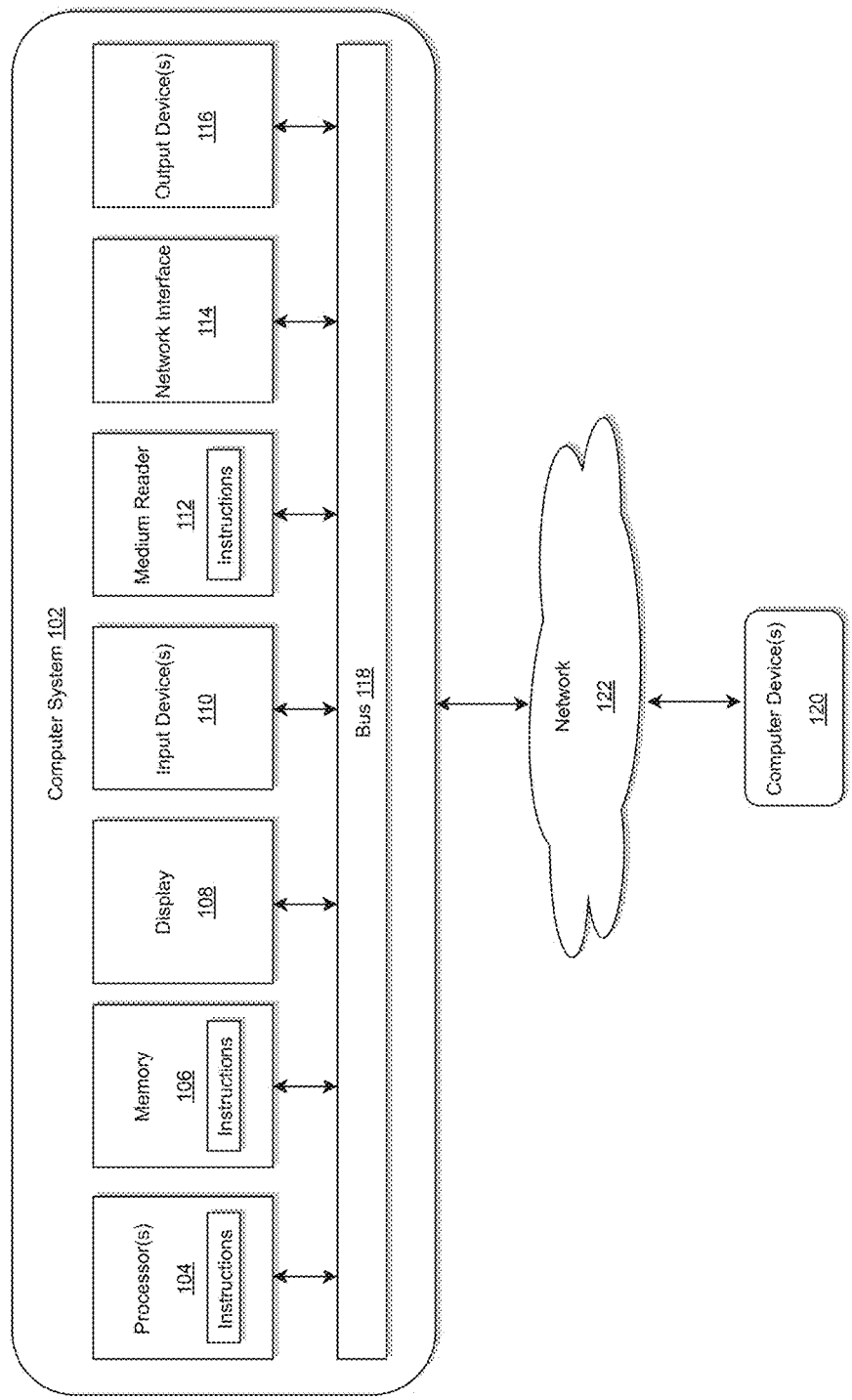
FIG. 1 illustrates a computer system for implementing a smart failover module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a smart failover module that that automatically fails over applications to another availability zone (AZ) when a system fault or degradation is detected in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a smart failover module that automatically fails over applications to a healthier AZ when a system fault or degradation is detected, but the disclosure is not limited thereto. For example, various embodiments may also provide optimized processes of implementing a smart failover module that implements a self-healing process on an unhealthy AZ, but the disclosure is not limited thereto. In addition, various embodiments may also provide optimized processes of implementing a smart failover module that builds an AZ agnostic application that automatically determines the health of an AZ and automatically migrates applications to a new healthy AZ if the current AZ is determined to be not healthy, but the disclosure is not limited thereto.

Figure 2:
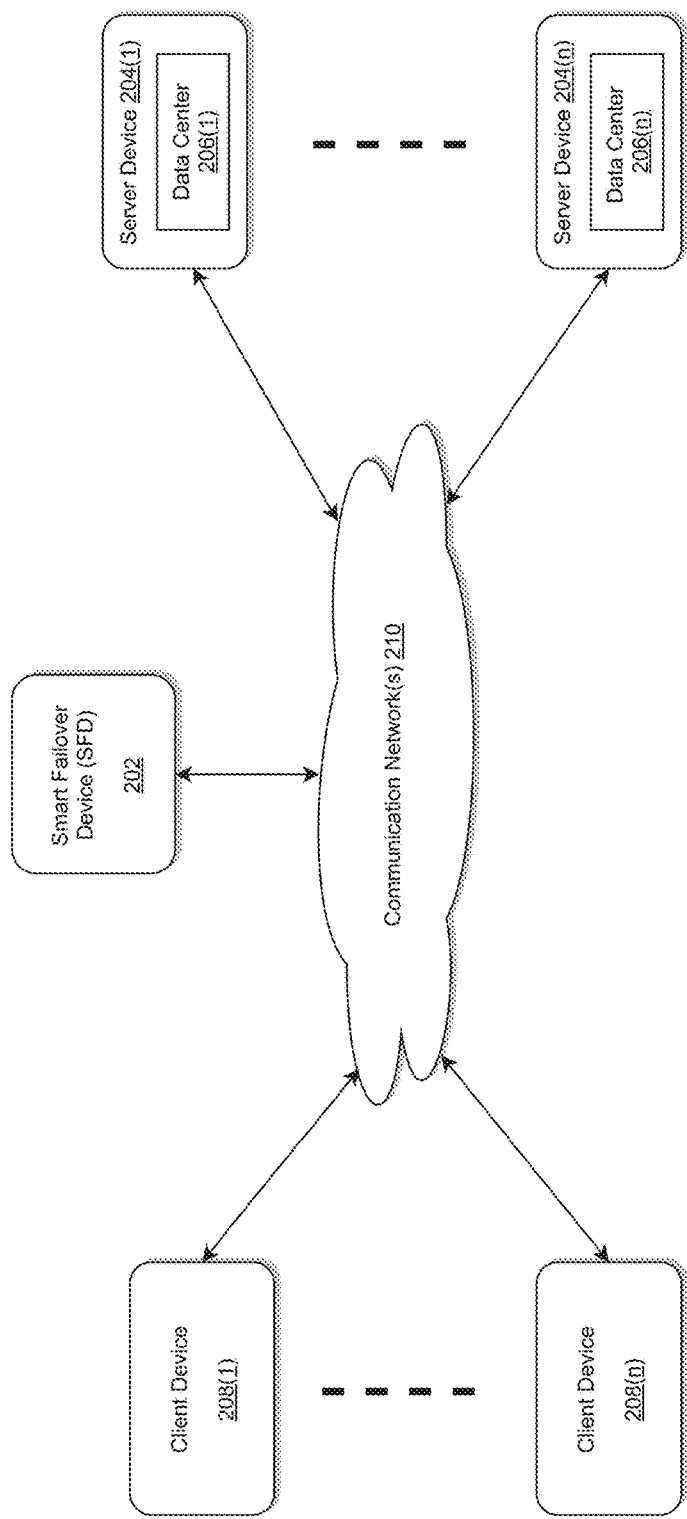
FIG. 2 illustrates an exemplary diagram of a network environment with a smart failover device in accordance with an exemplary embodiment.

Referring to FIG. 2, a schematic of an exemplary network environment 200 for implementing a smart failover device (SFD) of the instant disclosure is illustrated.

According to exemplary embodiments, the above-described problems associated with conventional methods and systems may be overcome by implementing a SFD 202 as illustrated in FIG. 2 by implementing a smart failover module that automatically fails over applications to a healthier AZ when a system fault or degradation is detected, but the disclosure is not limited thereto. For example, the above-described problems associated with conventional methods and systems may be overcome by implementing a SFD 202 as illustrated in FIG. 2 by implementing a smart failover module that implements a self-healing process on the unhealthy AZ; builds an AZ agnostic application that automatically determines the health of an AZ and automatically migrates applications to a new healthy AZ if the current AZ is determined to be not healthy, etc., but the disclosure is not limited thereto.

The SFD 202 may be the same or similar to the computer system 102 as described with respect to FIG. 1.

The SFD 202 may store one or more applications that can include executable instructions that, when executed by the SFD 202, cause the SFD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SFD 202 itself, may be located in virtual server(s) running in a cloud-based computing environment rather than being tied to one or more specific physical network computing devices. Also, the application(s) may be running in one or more virtual machines (VMs) executing on the SFD 202. Additionally, in one or more embodiments of this technology, virtual machine(s) running on the SFD 202 may be managed or supervised by a hypervisor.

In the network environment 200 of FIG. 2, the SFD 202 is coupled to a plurality of server devices 204(1)-204(n) that hosts a plurality of datacenters 206(1)-206(n), and also to a plurality of client devices 208(1)-208(n) via communication network(s) 210. A communication interface of the SFD 202, such as the network interface 114 of the computer system 102 of FIG. 1, operatively couples and communicates between the SFD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SFD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SFD 202 may be a standalone device or integrated with one or more other devices or apparatuses, such as one or more of the server devices 204(1)-204(n), for example. In one particular example, the SFD 202 may be hosted by one of the server devices 204(1)-204(n), and other arrangements are also possible. Moreover, one or more of the devices of the SFD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SFD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the datacenters 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SFD 202 that may be configured for implementing a smart failover module that automatically fails over applications to a healthier AZ when a system fault or degradation is detected; implements a self-healing process on the unhealthy AZ; builds an AZ agnostic application that automatically determines the health of an AZ and automatically migrates applications to a new healthy AZ if the current AZ is determined to be not healthy, etc., thereby improving efficiency and productivity in developing, deploying, supporting, running an application, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the SFD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SFD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SFD 202, the server devices 204(1)-204(n), or the client devices 208(1)-208(n), for example, may be configured to operate as virtual instances on the same physical machine. For example, one or more of the SFD 202, the server devices 204(1)-204(n), or the client devices 208(1)-208(n) may operate on the same physical device rather than as separate devices communicating through communication network(s) 210. Additionally, there may be more or fewer SFDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
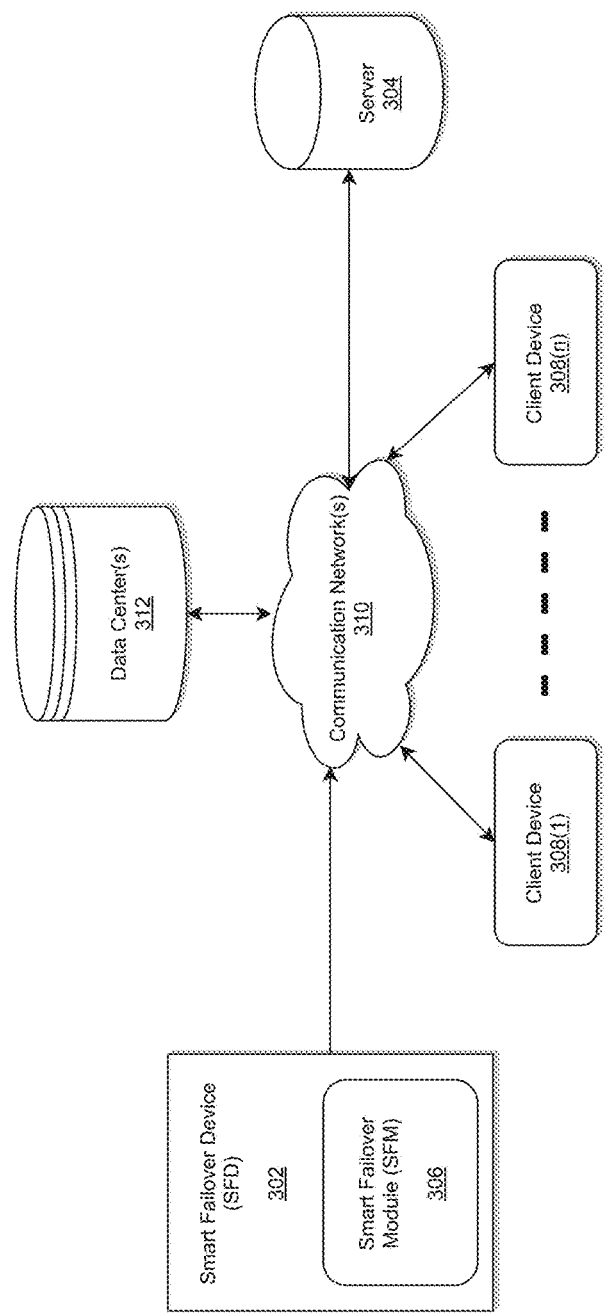
FIG. 3 illustrates a system diagram for implementing a smart failover device with a smart failover module in accordance with an exemplary embodiment.

FIG. 3 illustrates a system diagram 300 for implementing a SFD with a smart failover module (SFM) in accordance with an exemplary embodiment.

As illustrated in FIG. 3, the SFD 302 including the SFM 306 may be connected to a server 304, and a datacenter 312 via a communication network 310. The SFD 302 may also be connected to a plurality of client devices 308(1)-308(n) via the communication network 310, but the disclosure is not limited thereto. According to exemplary embodiments, the SFM 306 may be implemented within the client devices 308(1)-308(n), but the disclosure is not limited thereto. According to exemplary embodiments, the client devices 308(1)-308(n) may be utilized for implementing the SFM 306 that automatically fails over applications to a healthier AZ when a system fault or degradation is detected; implements a self-healing process on the unhealthy AZ; builds an AZ agnostic application that automatically determines the health of an AZ and automatically migrates applications to a new healthy AZ if the current AZ is determined to be not healthy, etc., thereby improving efficiency and productivity in developing, deploying, supporting, running an application, but the disclosure is not limited thereto.

According to exemplary embodiment, the SFD 302 is described and shown in FIG. 3 as including the SFM 306, although it may include other rules, policies, modules, datacenters, or applications, for example. According to exemplary embodiments, the datacenter 312 may be embedded within the SFD 302. Although only one datacenter 312 is illustrated in FIG. 3, according to exemplary embodiments, a plurality of datacenters 312 may be provided. The datacenter 312 may include one or more memories configured to store information data corresponding to a plurality of availability zones associated with running and/or deployment of an application but the disclosure is not limited thereto. For example, the datacenter 312 may include one or more memories configured to store information including: rules, programs, production requirements, testing requirements, control requirements, regulatory requirements, operational requirements, general other policies within an organization, etc., but the disclosure is not limited thereto. According to exemplary embodiments, the SFM 306 may be configured to be storage platform agnostic—configured to be deployed across multiple storage layers.

According to exemplary embodiments, the SFM 306 may be configured to receive continuous feed of data from the datacenter 312 and the server 304 via the communication network 310.

According to exemplary embodiments, the datacenter 312 may also be a private cloud-based datacenter that supports user authentication, datacenter security, and integration with existing datacenters and developments as well as stores open API specification definition file (i.e., in JSON format) corresponding to an application, but the disclosure is not limited thereto.

According to exemplary embodiments, the SFM 406 may be implemented via user interfaces, e.g., web user interface, a build automation tool used primarily for Java projects, private Jenkins, etc., but the disclosure is not limited thereto, and may be integrated with a private cloud platform and a distributed file system platform via the SFM 406 and an authentication service, but the disclosure is not limited thereto.

As will be described below, the SFM 306 may be configured to detect an application specific system fault or degradation event in a first availability zone, among a plurality of availability zones within a datacenter, on which an application is running during normal runtime of the application; determine, in response to detecting the application specific system fault or degradation event, whether the application includes an active-passive application infrastructure in which the first availability zone is paired with a passive availability zone; enable traffic, in connection with running or deployment of the application, on the passive availability zone in response to determining that the application includes an active-passive application infrastructure; and disable traffic from the first availability zone on which the application specific system fault or degradation has been detected in response to determining that the application does not include an active-passive application infrastructure and/or in response to enabling traffic on the passive availability zone, but the disclosure is not limited thereto.

The plurality of client devices 308(1)-308(n) are illustrated as being in communication with the SFD 302. In this regard, the plurality of client devices 308(1)-308(n) may be "clients" of the SFD 302 and are described herein as such. Nevertheless, it is to be known and understood that the plurality of client devices 308(1)-308(n) need not necessarily be "clients" of the SFD 302, or any entity described in association therewith herein. Any additional or alternative relationship may exist between either or more of the plurality of client devices 308(1)-308(n) and the SFD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the SFD 302 via broadband or cellular communication. Of course, these embodiments are merely exemplary and are not limiting or exhaustive.

Figure 4:
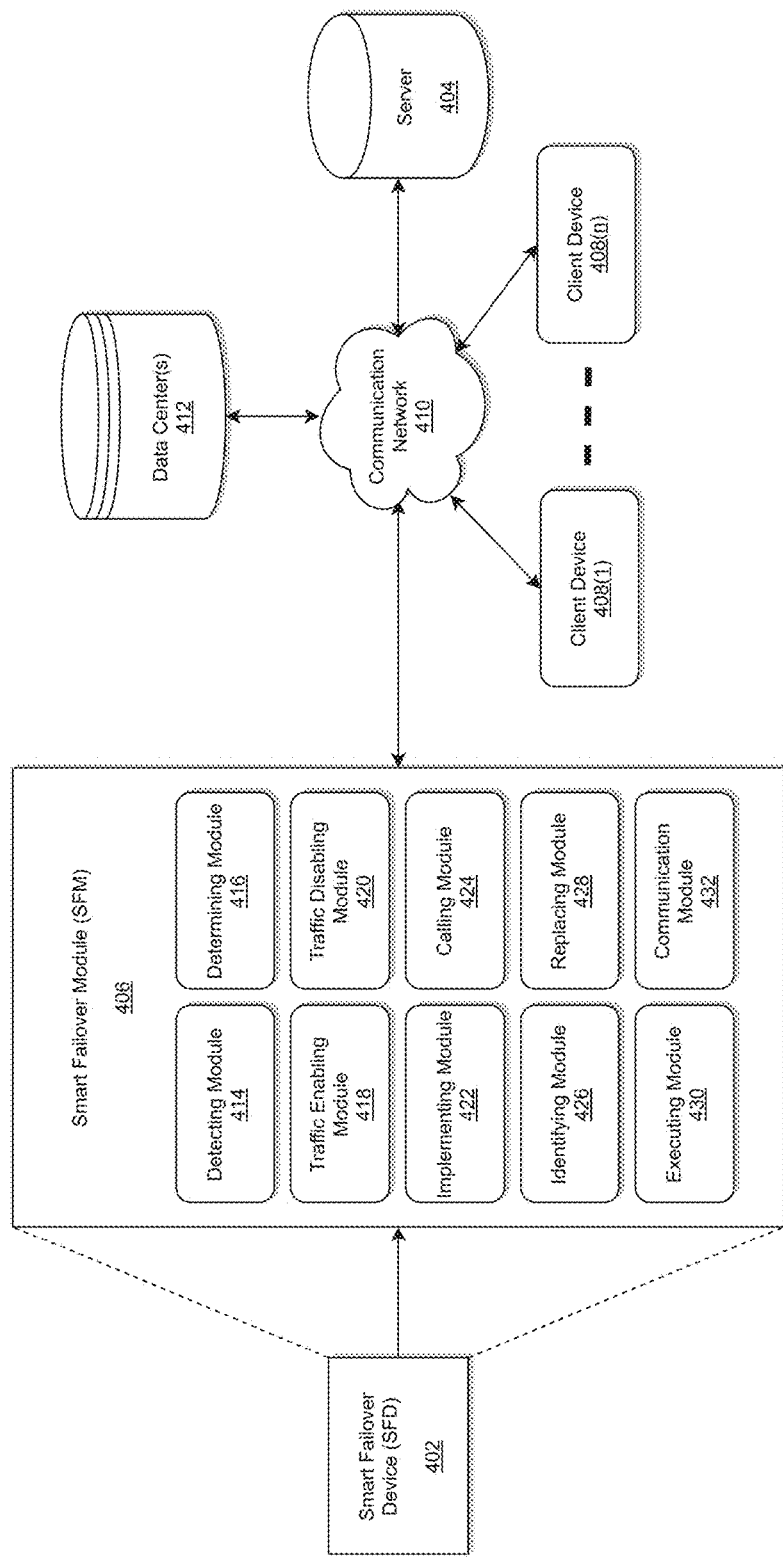
FIG. 4 illustrates a system diagram for implementing a smart failover module of FIG. 3 in accordance with an exemplary embodiment.

FIG. 4 illustrates a system diagram for implementing a smart failover module of FIG. 3 in accordance with an exemplary embodiment.

As illustrated in FIG. 4, the system 400 may include a SFD 402 within which a smart failover module (SFM) 406 may be embedded, a datacenter 412, a server 404, client devices 408(1)-408(n), and a communication network 410. According to exemplary embodiments, the SFD 402, the SFM 406, the datacenter 412, the server 404, the client devices 408(1)-408(n), and the communication network 410 as illustrated in FIG. 4 may be the same or similar to the SFD 302, the SFM 306, the datacenter 312, the server 304, the client devices 308(1)-308(n), and the communication network 310, respectively, as illustrated in FIG. 3.

As illustrated in FIG. 4, the SFM 406 may include a detecting module 414, a determining module 416, a traffic enabling module 418, a traffic disabling module 420, an implementing module 422, a calling module 424, an identifying module 426, a replacing module 428, an executing module 430, and a communication module 432. According to exemplary embodiments, the datacenter 412 may be external to the SFD 402 may include various systems that are managed and operated by an organization. Alternatively, according to exemplary embodiments, the datacenter 412 may be embedded within the SFD 402 and/or the SFM 406.

The process may be executed via the communication module 432 and the communication network 410, which may comprise plural networks as described above. For example, in an exemplary embodiment, the various components of the SFM 406 may communicate with the server 404, and the datacenter 412 via the communication module 432 and the communication network 410. Of course, these embodiments are merely exemplary and are not limiting or exhaustive.

According to exemplary embodiments, the communication network 410 and the communication module 432 may be configured to establish a link between the datacenter 412, the client devices 408(1)-408(n) and the SFM 406.

According to exemplary embodiments, each of the detecting module 414, determining module 416, traffic enabling module 418, traffic disabling module 420, implementing module 422, calling module 424, identifying module 426, replacing module 428, executing module 430, and the communication module 432 may be implemented by microprocessors or similar, they may be programmed using software (e.g., microcode) to perform various functions discussed herein and may optionally be driven by firmware and/or software. Alternatively, each of the detecting module 414, determining module 416, traffic enabling module 418, traffic disabling module 420, implementing module 422, calling module 424, identifying module 426, replacing module 428, executing module 430, and the communication module 432 may be implemented by dedicated hardware, or as a combination of dedicated hardware to perform some functions and a processor (e.g., one or more programmed microprocessors and associated circuitry) to perform other functions. Also, according to exemplary embodiments, each of the detecting module 414, determining module 416, traffic enabling module 418, traffic disabling module 420, implementing module 422, calling module 424, identifying module 426, replacing module 428, executing module 430, and the communication module 432 may be physically separated into two or more interacting and discrete blocks, units, devices, and/or modules without departing from the scope of the inventive concepts.

According to exemplary embodiments, each of the detecting module 414, determining module 416, traffic enabling module 418, traffic disabling module 420, implementing module 422, calling module 424, identifying module 426, replacing module 428, executing module 430, and the communication module 432 of the SFM 406 may be called by corresponding API, but the disclosure is not limited thereto.

For example, according to exemplary embodiments, the detecting module 414 may be configured to detect an application specific system fault or degradation event in a first availability zone, among a plurality of availability zones within the datacenter 412, on which an application is running during normal runtime of the application. According to exemplary embodiments, the detecting module 414 may include a monitoring tool, such as Dynatrace, Splunk, Custom API, etc., but the disclosure is not limited thereto.

According to exemplary embodiments, the determining module 416 may be configured to determine, in response to detecting the application specific system fault or degradation event, whether the application includes an active-passive application infrastructure in which the first availability zone is paired with a passive availability zone.

According to exemplary embodiments, the traffic enabling module 418 may be configured to enable traffic, in connection with running or deployment of the application, on the passive availability zone in response to determining that the application includes an active-passive application infrastructure.

According to exemplary embodiments, the traffic disabling module 420 may be configured to disable traffic from the first availability zone on which the application specific system fault or degradation has been detected in response to determining by the determining module 416 that the application does not include an active-passive application infrastructure and/or in response to enabling traffic on the passive availability zone.

According to exemplary embodiments, the implementing module 422 may be configured to implement a self-healing process on the first availability zone on which the application specific system fault or degradation has been detected. According to exemplary embodiments, the determining module 416 may be configured to determine that the self-healing process is successful and the traffic enabling module 418 may be configured to enable traffic back onto the first availability zone in response to determining by the determining module 416 that the self-healing process is successful.

According to exemplary embodiments, the determining module 416 may further be configured to determine whether the application includes an active-active application infrastructure in which the first availability zone is paired with an active availability zone. The traffic enabling module 418 may be configured to enable traffic, in connection with running or deployment of the application, on the active availability zone in response to determining by the determining module 416 that the application includes an active-active application infrastructure.

According to exemplary embodiments, the traffic enabling module may further be configured to enable traffic, in connection with running or deployment of the application, back onto the first availability zone after successfully performing the self-healing process by the implementing module 422 and in response to determining by the determining module 416 that the application does not include an active-active application infrastructure.

Figure 5:
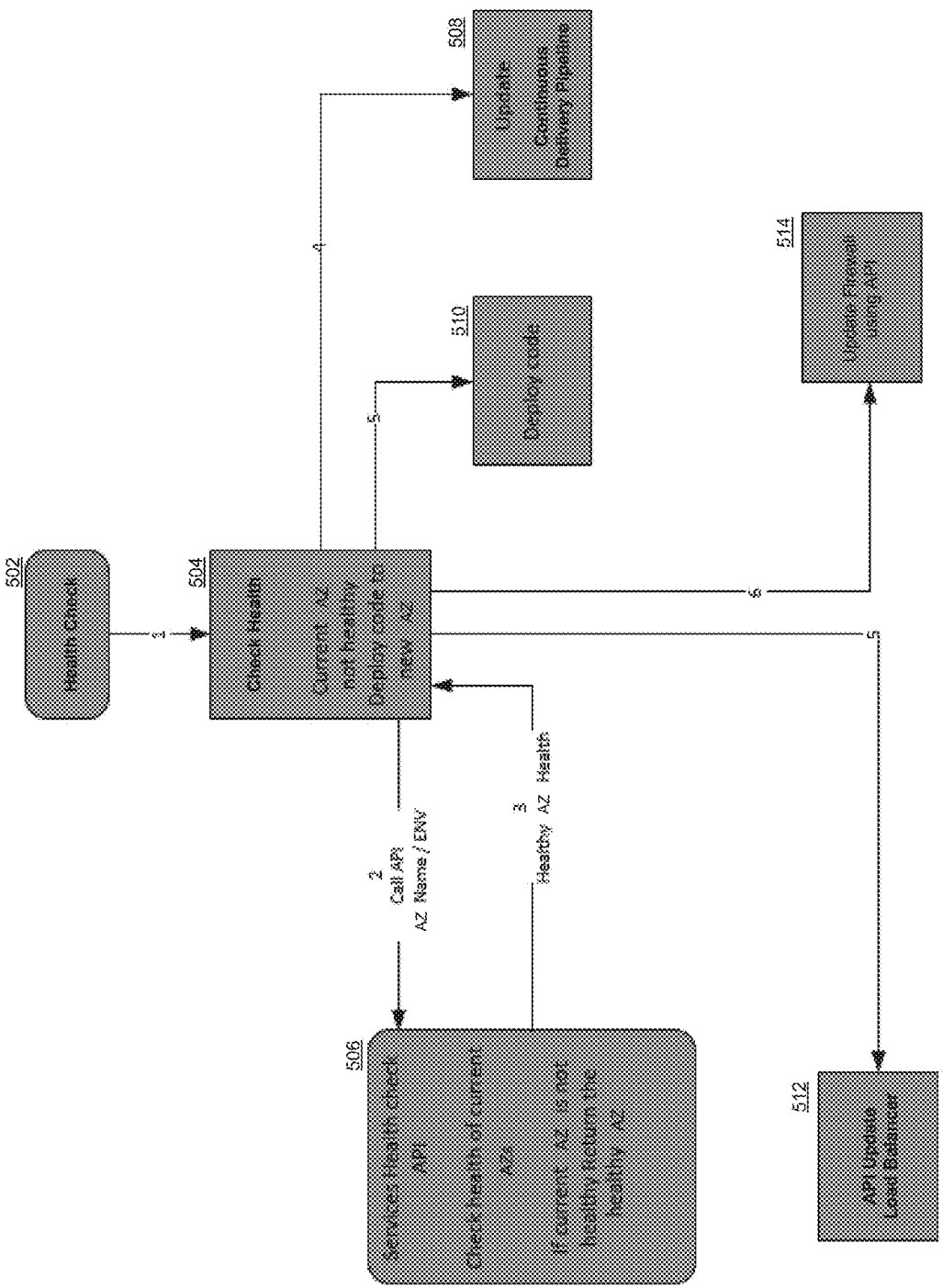
FIG. 5 illustrates an exemplary use case of service health check implemented by the smart failover module of FIG. 4 in accordance with an exemplary embodiment.

FIG. 5 illustrates an exemplary use case 500 of service health check implemented by the SFM 406 of FIG. 4 in accordance with an exemplary embodiment. As illustrated in FIG. 5, the exemplary use case 500 of health check may include a health check block 502, a determination block 504 for checking whether a current availability zone is healthy or not by calling services health check API block 506 which checks health of current availability zones in a continuous integration continuous delivery (CICD) pipeline. If a current availability zone is not healthy, the services health check API block 506 returns a healthy availability zone to the determination block 504. A deploy code block 510 then deploys the code in connection with an application. The exemplary use case 500 of health check may also include an update continuous delivery pipeline block 508 for updating the CICD pipeline, an API update block 512 for updating a load balancer with new IP address after determining that old unhealthy availability zone is being replaced with a new healthy availability zone in the CICD pipeline. The exemplary use case 500 may also include an update firewall block 514 for updating firewall after determining that old unhealthy availability zone is being replaced with a new healthy availability zone in the CICD pipeline. The "health" as disclosed herein may refer to whether an availability zone has required capacity for running and/or deployment of the application in the CICD pipeline.

Referring to FIGS. 4-5, according to exemplary embodiments, when the determining module 416 determines that the self-healing process implemented by the implementing module 422 is not successful, the calling module 424 may be configured to call an availability zone API to retrieve information data corresponding to the plurality of zones from the datacenter 412. The identifying module 426 may be configured dynamically identify, in response to calling the availability zone API (i.e., services health check API in the services health check block 506), a second availability zone that has a required capacity for running or deployment of the application among the plurality of availability zones within the same datacenter 412. The replacing module 428 may be configured to automatically replace, in response to a positive identification by the identifying module 426, the first availability zone with the second availability zone and the executing module 430 may be configured to run or deploy the application with the second availability zone.

According to exemplary embodiments, the calling module 424 may be configured to call a load balancer API (i.e., from the API update block 512) to update new internet protocol (IP) address for a load balancer associated with the running or deployment of the application in response to replacing the first availability zone with the second availability zone.

According to exemplary embodiments, the calling module 424 may be further configured to call a firewall API (i.e., from the update firewall block 514) to update firewall rules associated with the running or deployment of the application in response to replacing the first availability zone with the second availability zone.

According to exemplary embodiments, when the determining module 416 determines that none of the availability zones among the plurality of availability zones within the same datacenter 412 has the required capacity for running or deployment of the application, the identifying module 426 may be configured to dynamically identify, in response to calling the availability zone API, a third availability zone that has a required capacity for running or deployment of the application from the same region, but different datacenter. The replacing module 428 may be configured to automatically replace the first availability zone with the third availability zone and the executing module 430 may be configured to run or deploy the application with the third availability zone.

According to exemplary embodiments, the calling module 424 may be configured to call a load balancer API (i.e., from the API update block 512) to update new internet protocol (IP) address for a load balancer associated with the running or deployment of the application in response to replacing the first availability zone with the third availability zone.

According to exemplary embodiments, the calling module 424 may be further configured to call a firewall API (i.e., from the update firewall block 514) to update firewall rules associated with the running or deployment of the application in response to replacing the first availability zone with the third availability zone.

According to exemplary embodiments, the information data may include the following data: platform version that is being run, health information of all availability zones, and capacity details of all availability zones, etc., but the disclosure is not limited thereto.

Figure 6:
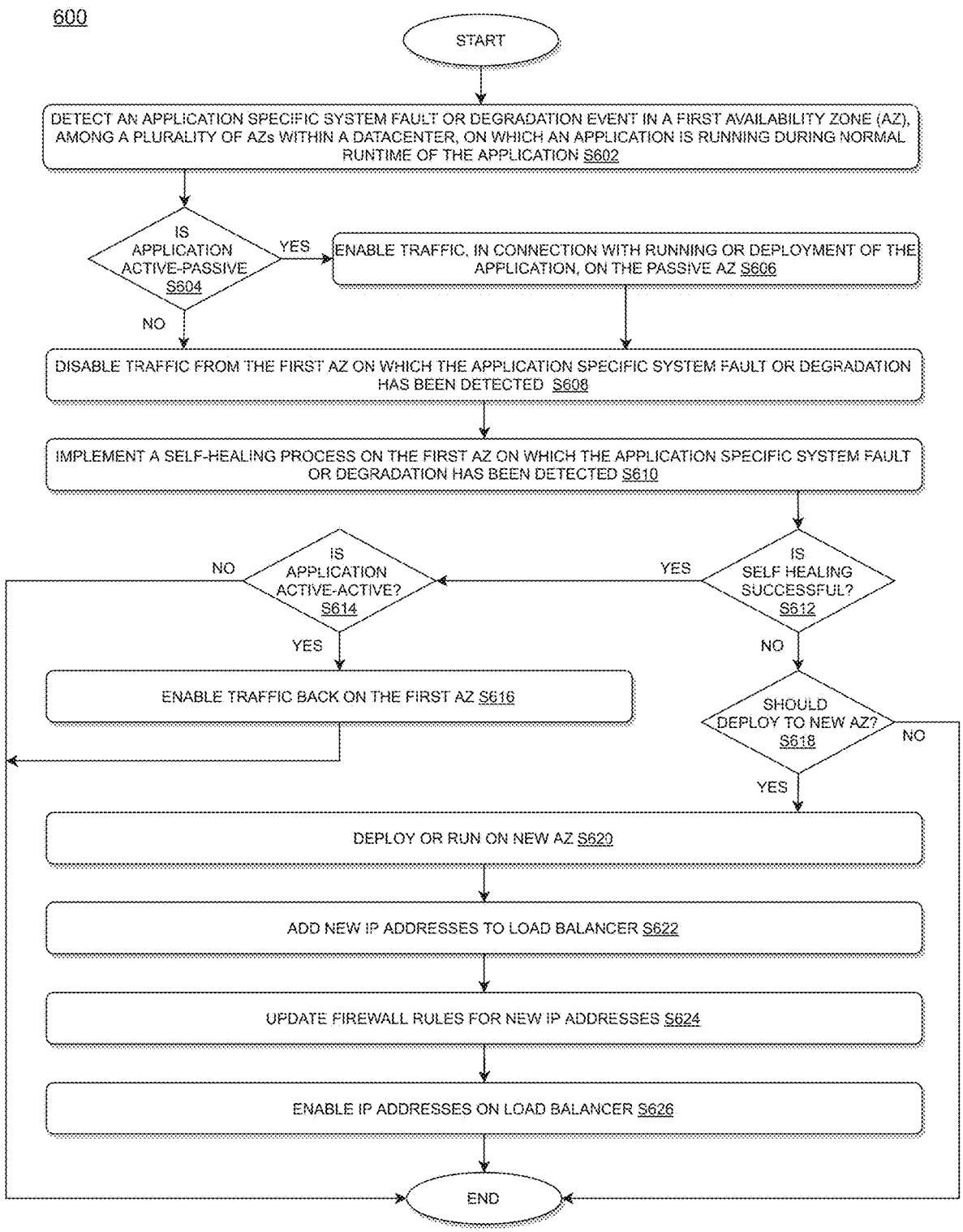
FIG. 6 illustrates a flow diagram for implementing a smart failover module in accordance with an exemplary embodiment.

FIG. 6 illustrates a flow diagram for implementing a smart failover module in accordance with an exemplary embodiment.

At step S602, the process 600 may detect an application specific system fault or degradation event in a first availability zone, among a plurality of availability zones within a datacenter, on which an application is running during normal runtime of the application.

At step S604, the process 600 may determine whether the application includes an active-passive application infrastructure. For example, when at step S604, the process determines that the application includes an active-passive application infrastructure in which the first availability zone is paired with a passive availability zone, at step S606 the process enables traffic, in connection with running or deployment of the application, on the passive availability zone.

At step S608, the process 600 may disable traffic from the first availability zone on which the application specific system fault or degradation has been detected in response to determining that the application does not include an active-passive application infrastructure and/or in response to enabling traffic on the passive availability zone.

At step S610, the process 600 may implement a self-healing process for fixing the problems associated with the first availability zone on which the application specific system fault or degradation has been detected.

At step S612, if it determined that the self-healing process is successful, at step S614, the process may further determine whether the application includes an active-active application infrastructure in which the first availability zone is paired with an active availability zone.

At step 616, the process may enable traffic, in connection with running or deployment of the application, back on the first availability zone after determining at step S614 that the application includes an active-active application infrastructure. At step 616, the process may also enable traffic, in connection with running or deployment of the application, on the active availability zone in response to determining that the application includes an active-active application infrastructure. The process 600 ends after enabling traffic back on the first availability zone at step S616 after successful self-healing determination at step S612 or when it is determined at step S614 that the application does not include an active-active application infrastructure.

The process 600 may also deploy the application utilizing the deployment pipeline when it is determined at step S606 that the first availability zone defined in the deployment pipeline has the required capacity.

At step S618, the process 600 may further determine whether the application should be run or deployed to a new availability zone when it is determined at step S612 that the self-healing process was not successful. For example, according to exemplary embodiments, when it is determined at step S618 that the application should be run or deployed to a new availability zone, at step S620, the process may deploy or run the application on the new availability zone. The process 600 is ended when at step S618 it is determined that the application should not be run or deployed to a new availability zone.

According to exemplary embodiments, prior to running or deploying the application on the new availability zone, health of the new availability zone may be determined. For example, when at step S612 it is determined that the self-healing process was not successful and when at step S618 it is determined that the application should be run or deployed to a new availability zone, the process 600 may further include: calling an availability zone API to retrieve information data corresponding to the plurality of zones from the datacenter; dynamically identifying, in response to calling the availability zone API, a second availability zone that has a required capacity for running or deployment of the application among the plurality of availability zones within the same datacenter; and automatically replacing, in response to a positive identification, the first availability zone with the second availability zone; and running or deploying the application with the new availability zone at step S620.

At step S622, the process 600 may add new interne protocol (IP) addresses to a load balancer. For example, the process 600 may call a load balancer API to update new IP address for a load balancer associated with the running or deployment of the application in response to replacing the first availability zone with the second availability zone.

At step S624, the process 600 may update firewall rules for the new IP addresses. For example, the process 600 may call a firewall API to update firewall rules associated with the running or deployment of the application in response to replacing the first availability zone with the second availability zone.

At step S626, the process 600 may enable IP addresses on the load balancer.

According to exemplary embodiments, when it is determined that none of the availability zones among the plurality of availability zones within the same datacenter has the required capacity for running or deployment of the application, the process 600 may further include: dynamically identifying, in response to calling the availability zone API, a third availability zone that has a required capacity for running or deployment of the application from the same region, but different datacenter; automatically replacing the first availability zone with the third availability zone; and running or deploying the application with the third availability zone.

According to exemplary embodiments, the process 600 may further include: calling a load balancer API to update new internet protocol (IP) address for a load balancer associated with the running or deployment of the application in response to replacing the first availability zone with the third availability zone.

According to exemplary embodiments, the process 600 may further include: calling a firewall API to update firewall rules associated with the running or deployment of the application in response to replacing the first availability zone with the third availability zone.

According to exemplary embodiments, the SFD 402 may include a memory (e.g., a memory 106 as illustrated in FIG. 1) which may be a non-transitory computer readable medium that may be configured to store instructions for implementing the SFM 406 that automatically fails over applications to a healthier AZ when a system fault or degradation is detected as disclosed herein. The SFD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SFM 406 or within the SFD 402, may be used to perform one or more of the methods and processes as described herein. In a particular embodiment, the instructions may reside completely, or at least partially, within the memory 106, the medium reader 112, and/or the processor 104 (see FIG. 1) during execution by the SFD 402.

For example, the instructions, when executed, may cause the processor 104 to perform the following: detecting an application specific system fault or degradation event in a first AZ, among a plurality of AZs within a datacenter, on which an application is running during normal runtime of the application; determining, in response to detecting the application specific system fault or degradation event, whether the application includes an active-passive application infrastructure in which the first AZ is paired with a passive availability zone; enabling traffic, in connection with running or deployment of the application, on the passive AZ in response to determining that the application includes an active-passive application infrastructure; and disabling traffic from the first AZ on which the application specific system fault or degradation has been detected in response to determining that the application does not include an active-passive application infrastructure and/or in response to enabling traffic on the passive AZ, but the disclosure is not limited thereto.

For example, the instructions, when executed, may further cause the processor 104 to perform the following: checking for another healthy AZ within the same datacenter or within other regions outside of the datacenter when it is determined that the first AZ is not healthy; replacing the unhealthy first AZ with new healthy AZ; updating new IP address for a load balancer associated with the deployment of the application in response to replacing the unhealthy first AZ with the new healthy AZ; and updating firewall rules associated with the deployment of the application in response to replacing the unhealthy first AZ with the new healthy AZ, but the disclosure is not limited thereto.

For example, according to exemplary embodiment, the instructions, when executed, may further cause the processor 104 to perform the following: implementing a self-healing process on the first AZ on which the application specific system fault or degradation has been detected.

According to exemplary embodiment, wherein the instructions, when executed, may further cause the processor 104 to perform the following: determining that the self-healing process is successful; and enabling traffic back onto the first AZ in response to determining that the self-healing process is successful.

According to exemplary embodiment, wherein the instructions, when executed, may further cause the processor 104 to perform the following: determining whether the application includes an active-active application infrastructure in which the first AZ is paired with an active AZ.

According to exemplary embodiment, wherein the instructions, when executed, may further cause the processor 104 to perform the following: enabling traffic, in connection with running or deployment of the application, on the active AZ in response to determining that the application includes an active-active application infrastructure.

According to exemplary embodiment, wherein the instructions, when executed, may further cause the processor 104 to perform the following: enabling traffic, in connection with running or deployment of the application, back onto the first AZ after successfully performing the self-healing process and in response to determining that the application does not include an active-active application infrastructure.

According to exemplary embodiment, wherein the instructions, when executed, may further cause the processor 104 to perform the following: determining that the self-healing process is not successful; calling an AZ API to retrieve information data corresponding to the plurality of zones from the datacenter; dynamically identifying, in response to calling the AZ API, a second AZ that has a required capacity for running or deployment of the application among the plurality of AZs within the same datacenter; automatically replacing, in response to a positive identification, the first AZ with the second AZ; and running or deploying the application with the second AZ.

According to exemplary embodiment, wherein the instructions, when executed, may further cause the processor 104 to perform the following: calling a load balancer API to update new IP address for a load balancer associated with the running or deployment of the application in response to replacing the first AZ with the second AZ.

According to exemplary embodiment, wherein the instructions, when executed, may further cause the processor 104 to perform the following: calling a firewall API to update firewall rules associated with the running or deployment of the application in response to replacing the first AZ with the second AZ.

According to exemplary embodiment, wherein when it is determined that none of the AZs among the plurality of AZs within the same datacenter has the required capacity for running or deployment of the application, and wherein the instructions, when executed, may further cause the processor 104 to perform the following: dynamically identifying, in response to calling the AZ API, a third AZ that has a required capacity for running or deployment of the application from the same region, but different datacenter; automatically replacing the first AZ with the third AZ; and running or deploying the application with the third AZ.

According to exemplary embodiment, wherein the instructions, when executed, may further cause the processor 104 to perform the following: calling a load balancer API to update new IP address for a load balancer associated with the running or deployment of the application in response to replacing the first AZ with the third AZ.

According to exemplary embodiment, wherein the instructions, when executed, may further cause the processor 104 to perform the following: calling a firewall API to update firewall rules associated with the running or deployment of the application in response to replacing the first AZ with the third AZ.

According to exemplary embodiments as disclosed above in FIGS. 1-7, technical improvements effected by the instant disclosure may include platforms for implementing a smart failover module that automatically fails over applications to a healthier AZ when a system fault or degradation is detected; implements a self-healing process on the unhealthy AZ; builds an AZ agnostic application that automatically determines the health of an AZ and automatically migrates applications to a new healthy AZ if the current AZ is determined to be not healthy, etc., thereby improving efficiency and productivity in developing, deploying, supporting, running an application, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database/datacenter, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a smart failover module by utilizing one or more processors and one or more memories, the method comprising:
   detecting an application specific system fault or degradation event in a first availability zone, among a plurality of availability zones within a datacenter, on which an application is running during normal runtime of the application;
   determining, in response to detecting the application specific system fault or degradation event, whether the application includes an active-passive application infrastructure in which the first availability zone is paired with a passive availability zone;
   enabling traffic, in connection with running or deployment of the application, on the passive availability zone in response to determining that the application includes an active-passive application infrastructure;
   disabling traffic from the first availability zone on which the application specific system fault or degradation has been detected in response to determining that the application does not include an active-passive application infrastructure and/or in response to enabling traffic on the passive availability zone;
   implementing a self-healing process on the first availability zone on which the application specific system fault or degradation has been detected;
   determining that the self-healing process is successful;
   enabling traffic back onto the first availability zone in response to determining that the self-healing process is successful; and
   determining whether the application includes an active-active application infrastructure in which the first availability zone is paired with an active availability zone.

2. The method according to claim 1, further comprising:
   enabling traffic, in connection with running or deployment of the application, on the active availability zone in response to determining that the application includes an active-active application infrastructure.

3. The method according to claim 1, further comprising:
   enabling traffic, in connection with running or deployment of the application, back onto the first availability zone after successfully performing the self-healing process and in response to determining that the application does not include an active-active application infrastructure.

4. The method according to claim 1, further comprising:
   determining that the self-healing process is not successful;
   calling an availability zone API to retrieve information data corresponding to the plurality of availability zones from the datacenter;
   dynamically identifying, in response to calling the availability zone API, a second availability zone that has a required capacity for running or deployment of the application among the plurality of availability zones within the same datacenter;

automatically replacing, in response to a positive identification, the first availability zone with the second availability zone; and
running or deploying the application with the second availability zone.

5. The method according to claim 4, further comprising:
calling a load balancer API to update new internet protocol (IP) address for a load balancer associated with the running or deployment of the application in response to replacing the first availability zone with the second availability zone.

6. The method according to claim 4, further comprising:
calling a firewall API to update firewall rules associated with the running or deployment of the application in response to replacing the first availability zone with the second availability zone.

7. The method according to claim 4, wherein when it is determined that none of the availability zones among the plurality of availability zones within the same datacenter has the required capacity for running or deployment of the application, the method further comprising:
dynamically identifying, in response to calling the availability zone API, a third availability zone that has a required capacity for running or deployment of the application from the same region, but different datacenter;
automatically replacing the first availability zone with the third availability zone; and
running or deploying the application with the third availability zone.

8. The method according to claim 7, further comprising:
calling a load balancer API to update new internet protocol (IP) address for a load balancer associated with the running or deployment of the application in response to replacing the first availability zone with the third availability zone.

9. The method according to claim 7, further comprising:
calling a firewall API to update firewall rules associated with the running or deployment of the application in response to replacing the first availability zone with the third availability zone.

10. The method according to claim 4, wherein the information data includes the following data: platform version that is being run, health information of all availability zones, and capacity details of all availability zones.

11. A system for implementing a smart failover module, comprising:
a datacenter having memories to store information data of all availability zones (AZs) associated with running or deployment of an application; and
a processor operatively connected to the datacenter via a communication network, wherein the processor is configured to:
detect an application specific system fault or degradation event in a first availability zone, among a plurality of availability zones within a datacenter, on which an application is running during normal runtime of the application;
determine, in response to detecting the application specific system fault or degradation event, whether the application includes an active-passive application infrastructure in which the first availability zone is paired with a passive availability zone;
enable traffic, in connection with running or deployment of the application, on the passive availability zone in response to determining that the application includes an active-passive application infrastructure;
disable traffic from the first availability zone on which the application specific system fault or degradation has been detected in response to determining that the application does not include an active-passive application infrastructure and/or in response to enabling traffic on the passive availability zone;
implement a self-healing process on the first availability zone on which the application specific system fault or degradation has been detected;
determine that the self-healing process is successful;
enable traffic back onto the first availability zone in response to determining that the self-healing process is successful; and
determine whether the application includes an active-active application infrastructure in which the first availability zone is paired with an active availability zone.

12. The system according to claim 11, wherein the processor is further configured to:
enable traffic, in connection with running or deployment of the application, on the active availability zone in response to determining that the application includes an active-active application infrastructure.

13. The system according to claim 11, wherein the processor is further configured to:
determine that the self-healing process is not successful;
call an availability zone API to retrieve information data corresponding to the plurality of availability zones from the datacenter;
dynamically identify, in response to calling the availability zone API, a second availability zone that has a required capacity for running or deployment of the application among the plurality of availability zones within the same datacenter;
automatically replace, in response to a positive identification, the first availability zone with the second availability zone; and
run or deploy the application with the second availability zone.

14. A non-transitory computer readable medium configured to store instructions for implementing a smart failover module, wherein the instructions, when executed, cause a processor to perform the following:
detecting an application specific system fault or degradation event in a first availability zone (AZ), among a plurality of AZs within a datacenter, on which an application is running during normal runtime of the application;
determining, in response to detecting the application specific system fault or degradation event, whether the application includes an active-passive application infrastructure in which the first AZ is paired with a passive AZ;
enabling traffic, in connection with running or deployment of the application, on the passive AZ in response to determining that the application includes an active-passive application infrastructure; and
disabling traffic from the first AZ on which the application specific system fault or degradation has been detected in response to determining that the application does not include an active-passive application infrastructure and/or in response to enabling traffic on the passive AZ;
implementing a self-healing process on the first availability zone on which the application specific system fault or degradation has been detected;
determining that the self-healing process is successful;

enabling traffic back onto the first availability zone in response to determining that the self-healing process is successful; and determining whether the application includes an active-active application infrastructure in which the first availability zone is paired with an active availability zone.

15. The non-transitory computer readable medium according to claim 14, wherein the instructions, when executed, cause the processor to further perform the following:

enabling traffic, in connection with running or deployment of the application, on the active availability zone in response to determining that the application includes an active-active application infrastructure.

16. The non-transitory computer readable medium according to claim 14, wherein the instructions, when executed, cause the processor to further perform the following:

enabling traffic, in connection with running or deployment of the application, back onto the first availability zone after successfully performing the self-healing process and in response to determining that the application does not include an active-active application infrastructure.

17. The non-transitory computer readable medium according to claim 14, wherein the instructions, when executed, cause the processor to further perform the following: determining that the self-healing process is not successful; calling an availability zone API to retrieve information data corresponding to the plurality of availability zones from the datacenter; dynamically identifying, in response to calling the availability zone API, a second availability zone that has a required capacity for running or deployment of the application among the plurality of availability zones within the same datacenter; automatically replacing, in response to a positive identification, the first availability zone with the second availability zone; and running or deploying the application with the second availability zone.

18. The non-transitory computer readable medium according to claim 17, wherein the instructions, when executed, cause the processor to further perform the following:

calling a load balancer API to update new internet protocol (IP) address for a load balancer associated with the running or deployment of the application in response to replacing the first availability zone with the second availability zone.

19. The non-transitory computer readable medium according to claim 17, wherein the instructions, when executed, cause the processor to further perform the following:

calling a firewall API to update firewall rules associated with the running or deployment of the application in response to replacing the first availability zone with the second availability zone.

20. The non-transitory computer readable medium according to claim 17, wherein when it is determined that none of the availability zones among the plurality of availability zones within the same datacenter has the required capacity for running or deployment of the application, the instructions, when executed, cause the processor to further perform the following:

dynamically identifying, in response to calling the availability zone API, a third availability zone that has a required capacity for running or deployment of the application from the same region, but different datacenter;

automatically replacing the first availability zone with the third availability zone; and running or deploying the application with the third availability zone.

* * * * *